United States Patent [19]

Baker et al.

[11] 4,278,338
[45] Jul. 14, 1981

[54] CAMERA-PROCESSOR APPARATUS

[75] Inventors: Charles W. Baker, Rochester; Robert J. Wilson, Webster; Dale F. Kempf, Rochester, all of N.Y.

[73] Assignee: Eastman Kodak Company, Rochester, N.Y.

[21] Appl. No.: 170,488

[22] Filed: Jul. 21, 1980

[51] Int. Cl.³ .................... G03B 17/50; G03B 27/32
[52] U.S. Cl. .................... 354/83; 354/299; 355/27; 219/216; 242/75.51
[58] Field of Search .................... 354/83, 297, 299; 355/27, 28, 100, 106, 72; 219/216; 242/75.3, 75.51; 352/159

[56] References Cited

U.S. PATENT DOCUMENTS

| 3,318,219 | 5/1967 | Anderson | 355/100 |
|---|---|---|---|
| 3,496,332 | 2/1970 | Lunde | 354/299 |
| 3,826,896 | 7/1974 | Thompson | 354/299 |
| 4,018,525 | 4/1977 | Broderick et al. | 355/27 |
| 4,158,496 | 6/1979 | Cieplik | 355/27 |
| 4,194,826 | 3/1980 | Lewis | 354/299 |

Primary Examiner—L. T. Hix
Assistant Examiner—Alan Mathews
Attorney, Agent, or Firm—John D. Husser

[57] ABSTRACT

Camera-processor apparatus of the type adapted to record and develop a lengthy roll of strip recording medium includes a heat-processing device which is adapted to concurrently heat-develop all images of a multi-image segment of such medium and to concurrently disengage from heating relation with all images of such a segment. A storage device downstream from the apparatus recording station alternately stores and feeds such multi-image segments to the processing device, thus allowing complete and uniform processing of one multi-image segment in a stationary condition while a subsequent multi-image segment is recorded in a moving condition.

7 Claims, 4 Drawing Figures

CAMERA-PROCESSOR APPARATUS

BACKGROUND OF THE INVENTION

1. Field of the Invention

The present invention relates to camera-processor apparatus for recording and developing images, e.g. of documents, and more particularly to such apparatus adapted for use with imaging media in a roll form, such as a long-strip of microfilm stored on a reel or cartridge.

2. Description of the Prior Art

The usual procedure for recording and processing document images on roll form recording media (e.g., microfilm rolls containing a film strip many feet in length) has been to first record a complete roll of images in a microfilm camera and then remove the roll and develop it in a separate processor. Besides requiring two separate pieces of equipment, this approach requires the operator to perform two separate operations before the image formation is completed. Operator time amounts to a considerable expense, and it would be desirable to record and develop the entire roll in one feed-through sequence. Also, there are occasions when it is desirable to see certain already-recorded portions of a roll before the entire roll has been recorded.

The development of various kinds of photothermographic films, i.e., ones developable using heat as opposed to processing liquids, has led to the design of various kinds of camera-processor apparatus which can record and develop a roll of film in a single feed-through operation.

In connection with simple step and repeat cameras, e.g., planetary microfilmers, a simple approach is to bring a heated platen into and out of contact with each individual film image just after its recording, during the pause for recording of the next image. Such a solution is not available in connection with continuous-flow cameras, e.g., rotary microfilmers, where the film and documents move continuously during recording.

One, more straightforward, approach for continuous-flow camera-processor is to provide a processing path, downstream from the exposure station, across a heated roller or platen. The processing path is of a sufficient length along the heating zone that adequate processing time is afforded to the film which is fed continuously thereover at the feed rate determined by the image recording operation. However, with this approach a problem exists when delays occur in the recording operation, e.g., if the operator pauses to rest briefly or needs to obtain more documents. When such recording delays occur, already recorded film that is downstream in the processing path also stops its movement, and it would be over-developed or burned if heating were not terminated. This problem has been avoided by retracting the heating means from its operating relation with the film when film feed stops. However, the chemistry of many photothermographic films is not compatible with a partial heat development followed by a pause and then the remainder of the "prescribed" heat processing period. Thus, poor image quality can result with respect to the film portions which reside in the processing section during such pauses.

An alternative approach disclosed in U.S. Pat. No. 4,158,496 allows uniform, continuous processing by accumulating segments of recorded film, severing them from the remainder of the strip and then feeding them completely through the processing section in a continuous manner. This avoids the problems of film pauses in the heat-processing section, but at the cost of cutting the film strip. Many applications use the entire roll as a continuous strip in storage and retrieval systems, and severing of the film at other than predetermined positions is not a desirable solution for those applications.

SUMMARY OF THE INVENTION

The present invention is aimed toward solving the above-outlined problems which exist in camera-processor apparatus. It is thus an object of the present invention to provide improved camera-processor apparatus that is useful in recording and developing a lengthy, continuous roll of strip recording medium in a single feed-through operation.

In general, camera-processor apparatus of the present invention has spaced film supply and take-up means, means defining a film feed path between the supply and take-up means and recording means and heat-developing means spaced along the film feed path and implements such improvements by (1) having said heat-developing means selectively activatable to heating and non-heating conditions so that, for all portions of a multi-image film segment on the feed path, the commencement and termination of heat-development occur respectively at substantially the same time and (2) having said path defining means selectively activatable to extend and contract the path length between said recording means and said heat-developing means in timed relation with activation of said heat-developing means.

BRIEF DESCRIPTION OF THE DRAWINGS

The foregoing and other objects and advantages will be further understood in view of the subsequent detailed description of preferred embodiments of the invention which is set forth with reference to the attached drawings wherein.

DETAILED DESCRIPTION OF THE PREFERRED EMBODIMENTS

Figure 1:
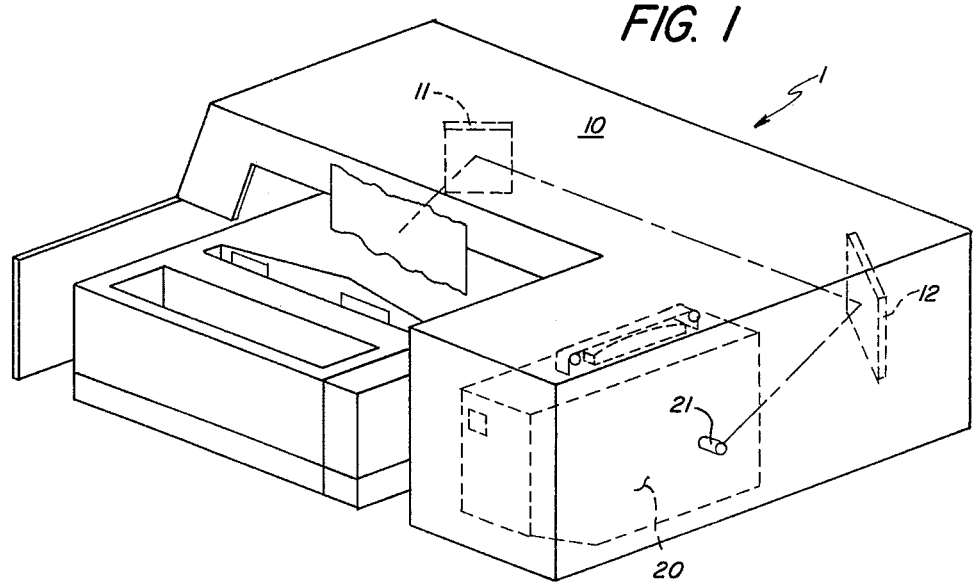
FIG. 1 is a diagrammatic perspective view, with certain portions removed, of a camera-processor apparatus according to the present invention.

Referring first to FIG. 1, the embodiment of camera-processor apparatus 1 comprises a document feeding and scanning assembly 10 and a film feeding and processing assembly 20. As shown an optical path, including mirrors 11 and 12, directs a flowing image of the document being exposed, which is reduced in magnification, to the film recording station 21. A housing, shown in dotted lines, maintains the optical path light-tight.

Figure 2:
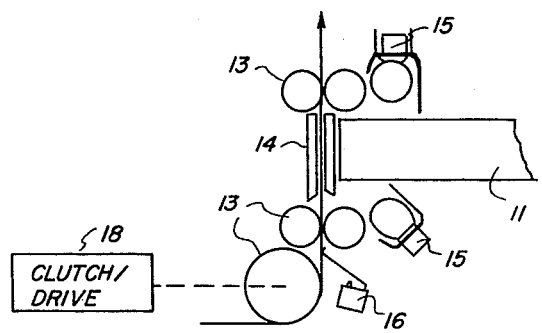
FIG. 2 is a diagrammatic side view of part of the document-handling portion of the apparatus shown in FIG. 1.

Referring to FIG. 2, the document recording station is illustrated in more detail. It includes document transport rollers 13, transparent document guide plates 14, document exposure lamps 15 and document sensing switch 16. Thus as documents are fed past the sensing switch 16 into the exposure zone between guides 14, the exposure lamps 15 are energized and strip images of the document are reflected by mirror 11 along the optical path toward the film recording station 21 (FIG. 1). It will be appreciated that the document feeding and scanning assembly 10 is only exemplary of the many alternative known devices of this type which can be utilized in combination with the present invention.

Figure 3:
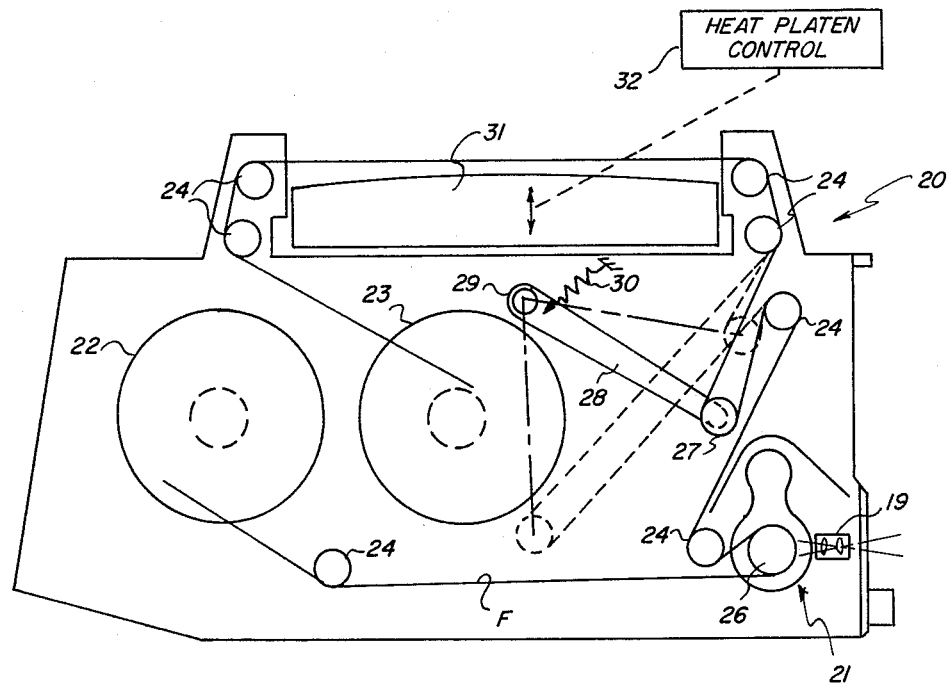
FIG. 3 is a diagrammatic side view of a portion of the apparatus shown in FIG. 1.

Referring now to FIG. 3, the film feeding and processing assembly 20 is shown in more detail. It includes film supply and take-up spools 22 and 23 and a series of guide rollers 24 which direct the film around the exposure and processing path between those spools. A film drive roller 26 is located along the film feed path at the recording station 21 and the opposing lens assembly 19 of the optical system directs the document image, reduced in size by the optical system, onto the film moving around roller 26. Downstream from the recording station 21, the film passes an idler roller 27 which is mounted on a tension arm 28 which is pivotable about axis 29 and urged to rotate in a clockwise direction, e.g., by spring means 30. Further downstream from the idler roller 27, the film passes in a substantially flat path over heating platen 31, which can be, for example, a stainless steel, vapor-heated hot block. The platen can be provided with known temperature control devices to maintain a substantially constant process temperature across the surface thereof that opposes the film path. The hot block is adapted for movement, into heating and non-heating relations with opposing films, e.g., by heat platen control 32 which can comprise a conventional reversible motor, gear drive and clutch assembly. It will be understood that alternative means could be provided to dispose the film in engaging and disengaging relations with the heat platen 31, e.g. the film could be lowered into a contacting relation with the platen. Or the heating means can be an infrared lamp or other heater means that is turned on and off to provide heating and non-heating with respect to multi-image film segments.

Figure 4:
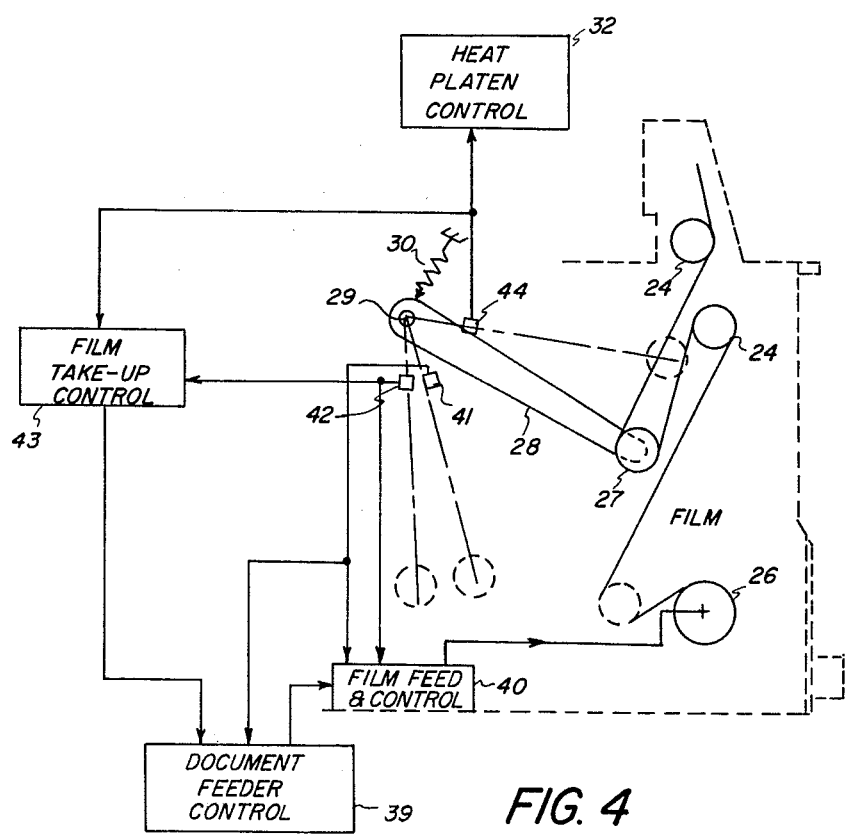
FIG. 4 is an enlarged view of a portion shown in FIG. 3 and includes elements of the apparatus control system.

Referring now to FIG. 4 as well as FIG. 3, the operation of the camera-processing apparatus will be explained. Upon receipt of a signal from document feeder control 39, film feed and control unit 40 activates the film drive roller 26 and film is moved from the film supply spool 22, past the lens 19 to expose the document image on the film. The film is then transported around the idler roller 27, over the film guide rollers 24 and heating platen 31 and finally to the film take-up spool 23.

As film is recorded, the storage loop, formed by clockwise movement of tension arm 28, increases in size to accept recorded film until the position of the film-tension arm activates the initial stop switch 41. A signal from switch 41 passes to document feeder control 39 and causes a clutch/drive means 18 in the document feeding and scanning assembly 10 to terminate document feed. At the same time a signal from control 39 to film feed control 40 stops film drive roller 26.

At this stage, the film tension arm 28 can be, e.g., the equivalent of one inch of film feed from the final limit switch 42. If there are residual documents in the document transport assembly the controls will record these on the last inch of film. If there are no documents in the document transport assembly (as might be the case if documents are being fed manually), the controls will advance this last inch unrecorded.

When the film tension arm 28 activates the final limit switch 42, drive means in film take-up control 43 is activated to rotate the film take-up spool 23. This advances the segment of film, which was recorded and stored by means of roller 27 and arm 28, into a position above the vapor-heated hot block 31. A film unload limit switch 44 transmits a signal to take-up control 43 to stop film take-up. This signal also activates the heat platen control 32 to lift heating platen 31, and a responsive signal from film take-up control 43 activates the document feeder and film feed controls to recommence recording operations.

The hot block remains in contact with the film for a predetermined time interval to affect processing and then is moved to a standby disengaged condition by its control 32. That is, when all the remaining documents in a given batch are recorded (or if the operator elects to stop recording for some reason) before the film tension arm 28 next reaches the initial stop switch 41, the film drive roller will stop advancing film. At the end of its processing interval, the heat platen will automatically be returned to its down position by control 32 and the system will remain in standby mode until more documents are fed into the microfilmer.

Thus it will be appreciated that by virtue of the film receiving and storing means, provided by idler roller 27 and film tension arm 28, a multi-image segment of film can be heat processed in a stationary condition, while continued document recording proceeds. Also, it will be noted that all images on the multi-image segment are engaged and disengaged by the heat block concurrently so that uniform processing of all images is achieved. As described above, if a delay occurs in recording operation, the independent control of the processing apparatus still provides its predetermined operation and moves to a disengaged position, awaiting completion of the recording of a next subsequent multi-image segment before commencing its next operation. It will be appreciated that the film receiving and storing means, as well as other specifically disclosed mechanisms, could take other configurations in accordance with the present invention. For example, the receiving and storing means could be in the form of a slidably mounted idler roller rather than one which pivots.

The invention has been described in detail with particular reference to certain preferred embodiments thereof, but it will be understood that variations and modifications can be effected within the spirit and scope of the invention.

What is claimed is:

1. In camera-processor apparatus of the type having spaced film supply and take-up means, means defining a film feed path between the supply and take-up means and recording means and heat-developing means spaced along the film feed path, the improvement wherein:
 (a) said heat-developing means is selectively activatable to heating and non-heating conditions with respect to film on said feed path so that, for all portions of a multi-image film segment, the commencement and termination of heat development occur respectively at substantially the same time; and
 (b) said film path defining means is selectively activatable to extend and contract the path length between said recording means and said heat-developing means in timed relation with the activation of said heat-developing means, whereby moving film can be recorded while recorded film is developed in a stationary condition.

2. In camera-processor apparatus of the type having supply means and take-up means adapted to supply and take up a lengthy roll of strip recording medium, means for feeding successive frames of such recording medium along an operative path from said supply means to said take-up means, a recording station located along said path and including means for recording images on successive portions of such medium, and a processing station located along said path at a location downstream from said recording station for developing recorded images, the improvement wherein:

(a) said processing station includes:

(1) heating means, including a heating surface, for concurrently engaging all images of a multi-image segment of such recording medium in heating relation and for concurrently disengaging from all images of such segment to a non-heating relation; and (2) control means for alternately disposing said heating means and such multi-image segments in such engaged, heating relation or such disengaged, non-heating relation; and (b) said apparatus further comprises means, downstream from said recording station and operable in timed relation with said control means, for receiving and storing such multi-image segments from said recording station while said heating means is in its engaged, heating relation and for feeding stored segments to said processing station while said heating means is in its disengaged, non-heating relation.

3. The invention defined in claim 2 wherein said heating means includes an elongated, heated platen that is movable into and out of contacting relation with such multi-image segments.

4. The invention defined in claim 2 wherein said receiving and storing means comprises a member which is movable to extend and contract the length of said operative path between said recording and processing stations.

5. The invention defined in claim 4 wherein said control means includes means responsive to the position of said movable member for actuating disposition of said heating means in said engaged, heating relation.

6. The invention defined in claim 4 further including means for selectively actuating said take-up means and wherein said control means includes means, responsive to the position of said movable member, for initiating take-up actuation to effect advance of a multi-image segment from said receiving and storage means into said heating means.

7. The invention defined in claim 2 wherein said control means includes means for disposing said heating means in said engaged, heating relation for a predetermined time period and then disposing said heating means in said disengaged, non-heating relation.

* * * * *